(12) United States Patent  
Quail (10) Patent No.: US 9,489,857 B2  
(45) Date of Patent: Nov. 8, 2016

(54) CONTROLLER FOR ELECTRICAL IMPULSE STRESS EXPOSURE TRAINING

(76) Inventor: Jeffrey James Quail, Winnipeg, CA (US)

(*) Notice: Subject to any disclaimer, the term of this patent is extended or adjusted under 35 U.S.C. 154(b) by 269 days.

(21) Appl. No.: 13/314,833

(22) Filed: Dec. 8, 2011

(65) Prior Publication Data

US 2012/0148992 A1 Jun. 14, 2012

Related U.S. Application Data

(60) Provisional application No. 61/459,220, filed on Dec. 9, 2010.

(51) Int. Cl.
| | |
|---|---|
| *G06F 17/00* | (2006.01) |
| *G09B 9/00* | (2006.01) |
| *F41A 33/02* | (2006.01) |
| *A01K 15/02* | (2006.01) |
| *F41G 3/26* | (2006.01) |
| *F41A 33/00* | (2006.01) |
| *A01K 27/00* | (2006.01) |
| *G09B 19/00* | (2006.01) |
| *F41H 13/00* | (2006.01) |

(52) U.S. Cl.
CPC ............. *G09B 9/003* (2013.01); *A01K 15/021* (2013.01); *A01K 15/023* (2013.01); *A01K 27/009* (2013.01); *F41A 33/00* (2013.01); *F41A 33/02* (2013.01); *F41G 3/2605* (2013.01); *F41G 3/2616* (2013.01); *F41H 13/0018* (2013.01); *G09B 19/003* (2013.01)

(58) Field of Classification Search
CPC .. A01K 15/021; A01K 27/009; F41A 33/02; F41A 33/00; F41G 3/2605; F41G 3/2616; G09B 9/003
USPC ............................................................ 434/11
See application file for complete search history.

(56) References Cited

U.S. PATENT DOCUMENTS

| | | |
|---|---|---|
| 4,487,583 A | 12/1984 | Brucker et al. |
| 4,695,058 A | 9/1987 | Carter, III et al. |
| 4,823,401 A | 4/1989 | Gammarino et al. |
| 5,815,077 A | 9/1998 | Christiansen |
| 6,047,664 A * | 4/2000 | Lyerly ........................... 119/719 |
| 7,872,849 B2 | 1/2011 | Elliott, Jr. |
| 8,016,594 B2 | 9/2011 | Ferris et al. |
| 8,267,691 B1 * | 9/2012 | Ferris et al. .................... 434/11 |
| 2004/0219498 A1 * | 11/2004 | Davidson ...................... 434/247 |

(Continued)

*Primary Examiner* — Nathan Hillery
(74) *Attorney, Agent, or Firm* — Ryan W. Dupuis; Kyle R. Satterthwaite; Ade & Company Inc.

(57) ABSTRACT

A control module used in combination with an activation device for generating an activation signal in response to a stress exposure training event and an electrical impulse device for delivering an electrical shock to the user. The control module has a housing for being carried on the user. The module includes a controller function which sends a shock signal to the impulse device to shock the user according to prescribed shock criteria in response to an activation signal. The control module can be used with various activation devices including light-based force-on-force training or video shoot-back simulations. An operator input of the controller enables the prescribed shock criteria stored on the controller which is carried on the user to be adjusted by an operator directly at the module or remotely.

21 Claims, 9 Drawing Sheets

(56) References Cited

U.S. PATENT DOCUMENTS

| | | | |
|---|---|---|---|
| 2005/0145196 A1* | 7/2005 | Crist et al. | 119/718 |
| 2006/0038002 A1* | 2/2006 | Quail | 231/7 |
| 2006/0192229 A1* | 8/2006 | Kato et al. | 257/207 |
| 2007/0095303 A1* | 5/2007 | Lee IV et al. | 119/718 |
| 2007/0297117 A1* | 12/2007 | Elliott | 361/232 |
| 2008/0206726 A1* | 8/2008 | Kalisvaart et al. | 434/247 |
| 2010/0227299 A1* | 9/2010 | Ferris et al. | 434/21 |
| 2011/0045445 A1* | 2/2011 | Spychalski | 434/23 |

\* cited by examiner

CONTROLLER FOR ELECTRICAL IMPULSE STRESS EXPOSURE TRAINING

This claims the benefit under 35 U.S.C. 119(e) of U.S. provisional application Ser. No. 61/459,220, filed Dec. 9, 2010.

FIELD OF THE INVENTION

The present invention relates to a modular controller which communicates between an electrical impulse device arranged to generate an electrical shock applied to a trainee and an activation device for activating electrical impulse device in response to a prescribed condition encountered in stress exposure training, and more particularly the present invention relates to a modular controller in which the electrical shock is generated according to prescribed shock criteria which is adjustable by an operator at the controller.

BACKGROUND

Various research has shown that, for some tasks, normal training procedures (training conducted under normal, non-stress conditions) often do not improve task performance when the task was to be performed under stress conditions. These results suggest that, under certain conditions, the transfer of training from classroom conditions to operational conditions may be poor when there are no stress-inclusive simulations or training.

Currently, there are several firearm training systems that utilize a pain penalty to create acute stress when training individuals. For years, non lethal training ammunition has been utilized to cause a pain penalty when the round strikes the trainee. The pain is caused by the transfer of kinetic energy into the body.

More recently, a laser based system described in U.S. Pat. No. 7,872,849 by Elliott, Jr. replaces dangerous projectiles with laser pulses that travel from the firearm when the trigger is pulled and activate sensing panels being worn by the student. These sensing panels send a message to an electrical shock device that delivers a single pulse to the student as a pain penalty.

Other firearm computer simulation companies have integrated an electrical shock device that is activated by an RF signal to an electrical shock device worn by the student as described in U.S. Pat. No. 8,016,594 by Ferris, et al. It delivers a single electrical shock pulse to the student as a pain penalty. The device is typically timed to match the video presentation of a suspect shooting at the officer.

Other training aids such as MILES™ gear and training IED's are used to assist in developing soldiers tactics on the battlefield. Neither of these types of products currently utilize a pain penalty for improper performance. As mentioned above, this severely limits the creation of stress during training and will not adequately prepare the students for real world encounters where they would be under acute stress.

The major limitation of these products is that they are designed to deliver the exact same pain penalty regardless of the student's level of performance under stress as in computer screen based simulators and known shock devices or no pain penalty at all is provided as in the MILES™ gear or training IED's.

SUMMARY OF THE INVENTION

According to one aspect of the invention there is provided a method of stress exposure training using an electrical impulse device arranged to be worn by a user and deliver an electrical shock to the user in response to a shock signal, the method comprising:

providing a controller storing prescribed shock criteria thereon and being arranged to generate the shock signal according to the prescribed shock criteria stored thereon in response to an activation signal;

providing an activation input on the controller for receiving the activation signal;

supporting the controller including the prescribed shock criteria stored thereon on the user such that the controller is in communication with the electrical impulse device; and enabling the prescribed shock criteria of the controller to be adjusted through an operator input of the controller.

By providing a controller with shock criteria adjustable at the user level by an operator using controls remotely or on the controller, multiple participants can be trained within a common training environment with the controller of each participant being customizable to that participant's level of stress inoculation. Furthermore, individual users can be trained in a more effective manner by readily varying the training program according to the participant's progress.

The configuration of the controller which functions in series between an activation device and an electrical impulse device either by direct connection or wirelessly ensures that the controller is well suited for use either as an add-on to existing stress exposure training equipment or with a dedicated electrical impulse device.

In a preferred embodiment, the controller is directly connected to the electrical impulse device; however, in further arrangements, the controller may communicate wirelessly or by other means with the impulse device.

In some instances there may be provided a remote operator input separate from the controller so as to enable adjustments to the prescribed criteria to be communicated wirelessly from the remote operator input to the controller.

In addition or as an alternative, there may also be provided a manually adjusted operator input directly on the controller so as to enable the prescribed shock criteria to be manually adjusted through the operator input on the controller.

Preferably an intensity of the electrical shock is designated as one criterion of the prescribed shock criteria and enabling the intensity of the electrical shock to be adjusted using the operator input. In this instance, a manually adjustable control may be provided as one operator input on the controller to enable the intensity of the electrical shock to be adjusted using the manually adjustable control. Alternatively, the intensity as well as other shock criteria could be adjusted through a remote operator input communicating wirelessly with the controller.

Preferably a duration of the electrical shock is also designated as one criterion of the prescribed shock criteria so as to enable the duration of the electrical shock to be adjusted using the operator input.

Another criterion of the prescribed shock criteria may include designating a prescribed number of activation signals to be received before generating one shock signal. Preferably the prescribed number of activation signals can be adjusted using the operator input.

In some embodiments, the controller may communicate with a plurality of electrical impulse devices worn by the user in which each electrical impulse device includes an identification and the identification of one of the electrical impulse devices is designated as one criterion of the prescribed shock criteria.

Preferably a frequency of the electrical shock is also designated as one criterion of the prescribed shock criteria so as to enable the frequency of the electrical shock to be adjusted using the operator input.

The controller preferably includes a plurality of controller modes associated therewith in which each controller mode has different prescribed shock criteria. In this manner, the prescribed shock criteria can be adjusted by enabling an operator to select one of the controller modes using the operator input on the controller supported on the user. Preferably the prescribed shock criteria for each controller mode includes duration of the electrical shock and an intensity of the electrical shock and the criteria for each mode is different than the others.

There may be provided an intensity ramping mode, also described herein as a Move to Cover mode, among the controller modes. In this instance an intensity of each electrical shock is increased in at least one of duration or intensity in relation to a previously generated shock signal.

There may also be an injury simulating mode in which a plurality of shock signals are generated at periodic intervals from one another in response to a single activation signal.

Preferably the controller supported on the user includes a display which identifies which controller mode has been selected.

When the controller is provided with a memory, the controller is preferably arranged to record activation data associated with the activation signals received by the controller, for example including a location of activation by sensor identification or a cumulative number of activation signals received such that activation location or the cumulative number of activation signals can be recalled from memory and also displayed on the controller when requested by an operator.

When providing a remote operator input device, the remote device preferably also includes a display arranged to display the mode selected as well as other statistical data recorded during use such as the cumulative number of activation signals received or the sensor identification corresponding to the location of activation on the user.

Preferably a vibration module is provided in communication with the controller which is arranged to vibrate in response to a vibration signal. In this instance a vibration mode is associated with the controller and the controller is arranged to generate the vibration signal instead of the shock signal in response to the activation signal when the vibration mode is selected by an operator using the operator input on the controller.

The controller may be used in combination with a light-based training system comprising a simulated weapon arranged to generated a light-based signal, a support structure arranged to be self supporting on a body of the user, and an activation device supported on the support structure and having sensor arranged to detect a light-based signal directed thereon by the simulated weapon so as to be arranged to generate the activation signal upon detection of the light-based signal. The light-based signal may in the form of focused lasers or other non-focused project light within the visible or non-visible spectrum.

For example, in some embodiments the controller can be used with a light-based training system such as the MILES™ gear system in which the light-based signal from the simulated weapon comprises infrared light, for example in coded form, generally directed towards one or more infrared sensors located on the support structure carried on the body of the user.

In alternative embodiments, the light-based training system may comprise laser-based force-on-force training equipment such as the type described in U.S. Pat. No. 7,872,849 by Elliott, Jr. in which the light-based signal from the simulated weapon comprises a coded laser beam arranged to be detected by solar cell type sensors on the support structure carried on the body of the user.

Alternatively an activation signal input on the controller may be arranged to receive activation signals in the form of a radio frequency signal. In this instance, the controller may be utilized in combination with a simulated explosive device comprising a trigger arranged to generate the activation signal in response to a prescribed condition and a transmitter arranged to transmit the activation signal in the form of a radio frequency signal to the controller in response to the activation signal being generated by the trigger.

According to a further aspect of the present invention there is provided a control module in combination with an activation device arranged to generate an activation signal and an electrical impulse device arranged to be worn by a user and deliver an electrical shock to the user in response to a shock signal for stress exposure training, the control module comprising:

a housing arranged to be supported on the user;

a controller supported on the housing and including prescribed shock criteria stored thereon, the controller being arranged to generate the shock signal according to the prescribed shock criteria in response to an activation signal;

an activation input on the controller in communication with the activation device so as to be arranged to receive the activation signal from the activation device;

a shock output on the controller in communication with the electrical impulse device so as to be arranged to transmit the shock signal to the electrical impulse device; and an operator input arranged to enable the prescribed shock criteria on the controller to be adjusted.

Preferably the housing of the controller is modular such that the activation input is readily separable from the activation device and the shock output is readily separable from the electrical impulse device.

The present invention allows for the ability to vary electrical pain stimulus and vibrations to assist in training humans for performance under acute stress. The software program that utilizes a methodology housed in a controller that receives and sends information based on the software program. The controller is designed to be incorporated into existing training products such as firearm computer simulators and force on force firearm laser engagement training systems. This includes systems with an existing method of creating a pain penalty and systems like MILES™ gear that does not currently include a pain penalty.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures, there is illustrated a shock signal controller 10 for use in various forms of stress exposure training. The controller 10 is provided in the form of a control module which connects between an activation device 12 and an electrical impulse device 14.

Figure 8:
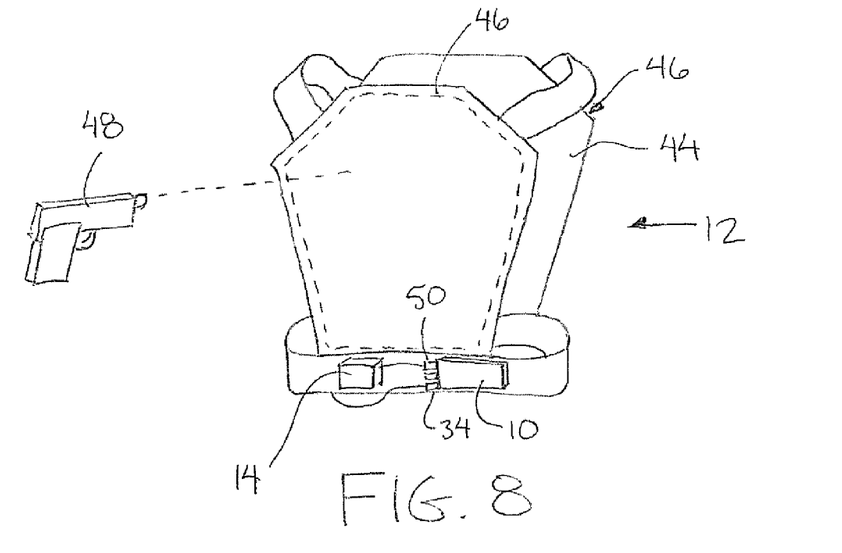
FIG. 8 is a perspective view of the controller used in conjunction with a laser-based force-on-force system.
Figure 10:
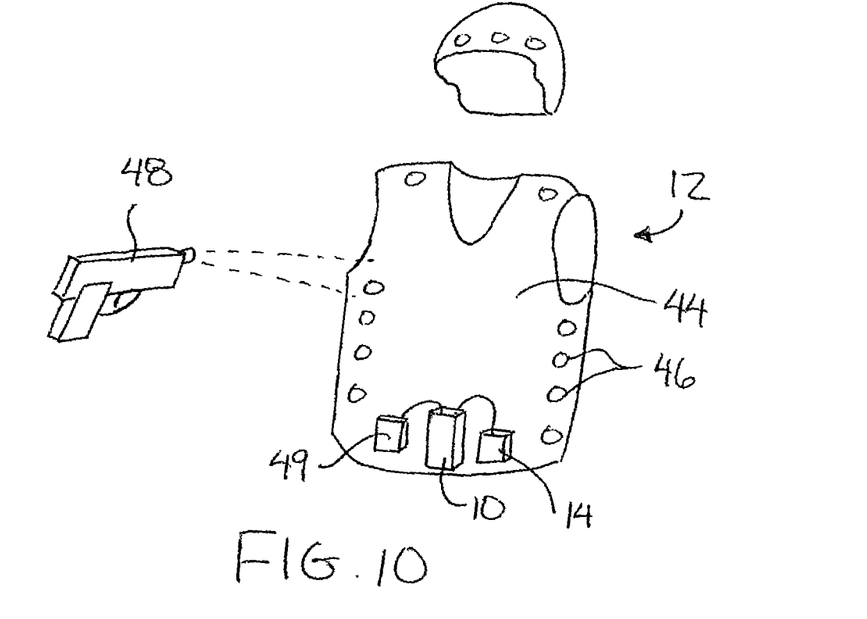
FIG. 10 is a schematic representation of the controller in combination with MILES™ gear.

The activation device 12 may comprise a dedicated device associated with the control module, or in alternative arrangements the activation device may comprise a component of an existing stress exposure training system. For example, as shown in FIG. 8, the control module may be used with an activation device in the form of a laser based training system including laser sensors worn by users which detect laser pulses from a laser weapon carried by a separate user as described in further detail below, or with MILES™ training gear as shown in FIG. 10.

Alternatively, the activation device may comprise a video simulation training system 16, a simulated explosive device 18 or an operator remote 20 to be used in a variety of training scenarios. These alternative activation devices are also described in further detail below with regard to the description of FIG. 9.

In each instance, the activation device assesses when a prescribed event has occurred or when a prescribed condition has been met which should result in the user being penalized. Accordingly, when the prescribed condition has been met, the activation device generates an activation signal which is input into the controller. The controller then produces a shock signal according to prescribed shock criteria in response to the activation signal. The shock signal instructs the electrical impulse device to deliver an electrical shock to the user according to the prescribed shock criteria as selected by an operator of the system.

The electrical impulse device 14 also comprises a separate module arranged to be worn by the user. The device includes a pair of electrodes arranged to be positioned against the user directly or through clothing so as to deliver an electrical shock to the user when the impulse device receives the shock signal from the controller 10. By providing the impulse device as a separate module within its own respective housing, one or more electrical impulse devices can be associated with the controller and placed at any selected location on the body of the user.

The control module forming the controller 10 includes its own housing in the form of a rigid casing including a front portion 22 and a rear portion 24 which are coupled together to enclose a hollow interior of the housing. A suitable access panel 26 provides access to a battery compartment within the housing which locates a battery 28 therein to provide electrical power to the electrical components of the controller.

The function of the controller is provided by a printed circuit board 30 supported on the respective mounting pegs 32 within the interior of the housing. The printed circuit board includes a suitable processor and a memory for storing programming to execute the various controller functions as described herein.

The modular configuration of the controller permits the control module to be readily separated from the activation device and the impulse device with which it is associated for use with different training systems. The control module is also well adapted to being supported directly on the user upon which the electrical impulse device is also supported for making adjustments to the shock signal and the resulting electrical shock delivered to the user at an individual user level.

The control module further includes an activation input 34 in the form of a connector supported externally on the housing which communicates internally with the printed circuit board. The connector of the activation input permits direct coupling to the activation device by a suitable communication wire and the like.

Figure 9:
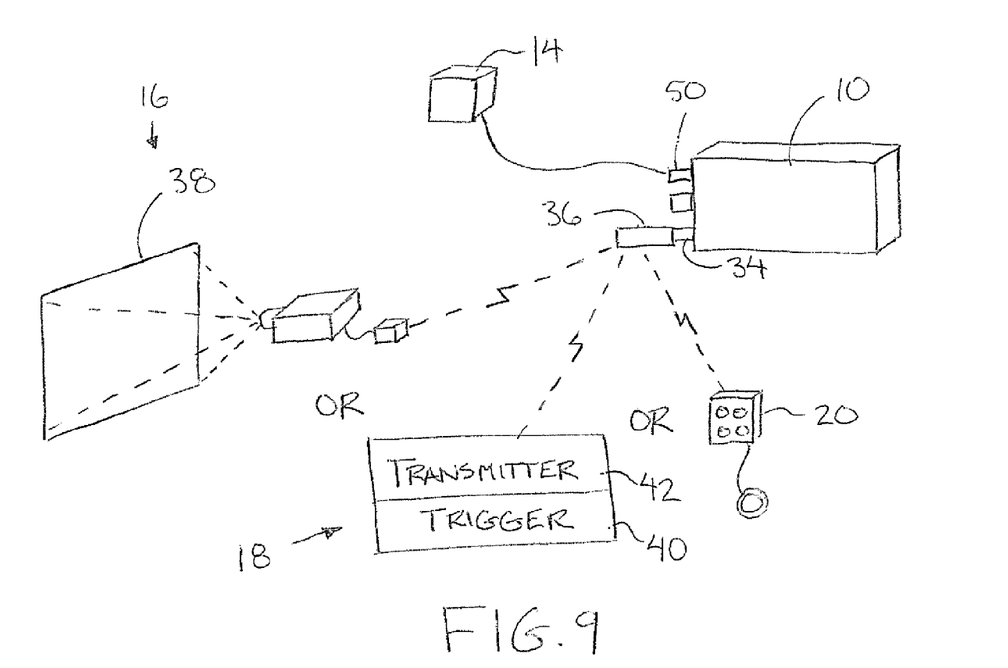
FIG. 9 is schematic representation of the controller including an RF receiver for use with either: i) a video simulator shoot-back system, ii) a simulated explosive device, or iii) an instructor remote control device.

Alternatively, the input may be connected to a receiver module 36 including a radio frequency receiver arranged to receive activation signals in the form of an RF signal as in the examples of FIG. 9. When used within a video simulation 16 in which a video is provided on a suitable display 38, the system may be arranged to generate activation signals based on the user's reaction to the scenario displayed by the system. In some instances, the system may generate the activation signal automatically in response to a specific scenario presented to the user.

Alternatively, the activation signal may be generated by the remote 20 which takes the form of a suitable keyfob. The remote in this instance can be held by an operator which judges the user's reaction to the video simulation on the display or to other scenario's presented by other means such that the operator of the remote judges when an activation should be triggered for penalizing the user.

In an alternative arrangement of a simulated explosive device 18, the device typically comprises a trigger 40 which generates the activation signal in response to a prescribed condition being met and a transmitter 42 coupled to the trigger within a common housing to transmit the generated activation signal in the form of an RF signal to the receiver module 36 on the activation input of the controller. Where the simulated explosive device is intended to simulate real world improvised explosive devices, the trigger may be similarly configured such that suitable triggers include trip wires, motion detection, or various other electronic triggering including detection of a laser beam being broken for example.

In a preferred embodiment, the activation device comprises a light-based training system used in force on force training, for example a laser training system as shown in FIG. 8 or a MILES™ gear training system as shown in FIG. 10.

The light-based MILES™ training system of FIG. 10 generally comprises a support structure 44 such as a vest worn about the torso of the user or a helmet which supports multiple infrared sensors 46 thereon. A simulated weapon 48 carried by another user substantially directs a projected beam of infrared light which is recorded as a hits when received by one of the infrared sensors 46 on the vest. Once the controller of the MILES™ system determines the user has been hit, the hit is recorded. The controller 10 of the present invention communicates with the controller 49 of the MILES™ system by direct or wireless communication to determine an activation signal has been received when the MILES™ controller determines the user has been hit.

The laser based training system of FIG. 8 similarly includes a suitable support structure such as a vest arranged to be self supporting about the torso of the user. The sensors 48 mounted on the support structure 44 in this instance comprise multiple laser sensors 46, such as a front panel and a rear panel. Each of the sensors includes a corresponding identification associated therewith. The sensors are arranged to detect a coded laser pulse directed thereon from a simulated weapon 48 carried by another user. Preferred lasers include infrared lasers or other related laser beams which the sensors can distinguish from ambient light.

The vest 44 may also be adapted to support the control module directly thereon for supporting the module on the user. The electrical impulse device may also be supported on the vest or at a separate location on the user. In this instance, when a user triggers the weapon, and the laser beam generated by the laser weapon is directed on one of the sensors 46 of the vest, an activation signal (including the associated sensor identification) is transmitted to the control module and is recorded as a hit on the user wearing the control module.

The control module also includes a shock output 50 in the form of a connector provided externally on the housing also in communication with the printed circuit board. The output 50 serves to connect the printed circuit board to the electrical impulse device. Typically, the controller is directly connected to the impulse device through a suitable flexible wire or cable communicating connector however various wireless transmission and receiver functions may be provided. Wireless communication may be more suitable for communication with multiple electrical impulse devices when multiple electrical impulse devices are associated with a single controller. In this instance, a shock signal is generated by the controller which typically includes an identification of one associated electrical impulse device depending upon the type of activation signal received. The shock signal can thus be transmitted to target a specific location on the user which may be related to a specific sensor when multiple sensors are provided on the user.

In addition to a sensor identification being associated with the activation signals in the instance of multiple sensors, a controller identification may be provided in association with the activation signal in the instance where multiple users, each with their own respective controller are interacting within a common stress exposure training environment and it is desired to target one specific user by any one of the various activation devices described in FIG. 9.

Figure 11:
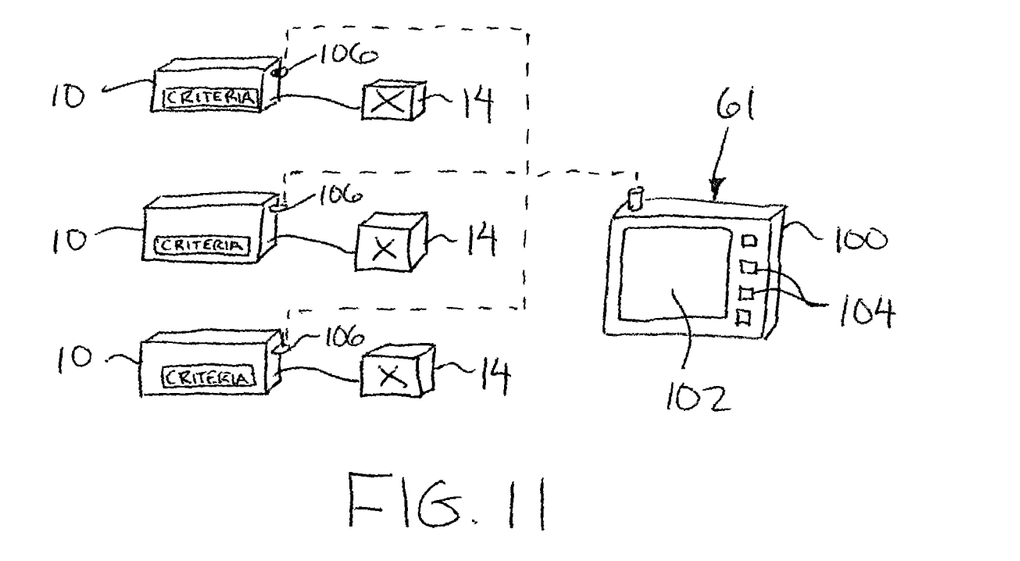
FIG. 11 is a schematic representation of an alternative embodiment of the operator input in the form of a remote operator input device and an alternative embodiment of the controllers which include an integral receiver for wireless communication with the remote operator input device.

The housing of the control module also includes a plurality of operator inputs 52 for adjusting various operating characteristics of the controller. In the first illustrated embodiment, one operator input is provided in the form of a manual adjustment knob 54 mounted at one end of the housing between the shock output 50 and the activation input 34 so as to be somewhat isolated and protected from accidental adjustment. The operator inputs also include a power switch 56 controlling the activation and shut off of the controller, a mode selection button 58 for toggling the controller between a plurality of different operator modes, and a display button 60 for selecting optional data to be displayed on a respective display 62 of the housing. Other operator inputs may be provided through a remote operator input device 61 as shown in FIG. 11 and described in further detail below which communicates wirelessly with a suitable receiver on the controller 10 in addition to or in place of the manual operator inputs supported directly on the controller.

The display 62 includes a first display area arranged to display numerical data including the number associated with a currently selected operator mode or a total number of hits recorded by the controller. The number of hits is determined by recording each activation signal received by the controller in the memory of the printed circuit board and displaying the cumulative number of activation signals as hits on the display area when selected by the display button 60. The display of the controller also includes a power indicator 64 which serves to indicate when the controller is activated by being illuminated. An activation indicator 66 is also provided which indicates when a condition has been met to generate a shock signal.

The controller is programmed so as to be arranged to generate the shock signal according to various prescribed shock criteria stored on the printed circuit board on the controller itself. The shock criteria includes an intensity or magnitude of the shock in volts, the duration that the shock is applied, and the frequency that multiple separate shocks are delivered to the user according to certain selected modes. The shock criteria also includes various additional criteria dependent upon the mode selected by the operator using the operator inputs. Each criterion is arranged to be adjusted by the user either directly or indirectly by mode selection. The manual adjustment knob 54 adjusts the intensity of the shock to be delivered to the user such that the intensity can be directly adjusted by an operator adjusting the knob on the controller carried on the user. The other shock criteria are typically adjusted by mode selection. Each selected mode includes different criteria such as intensity of the shock, frequency, and duration.

In some instances, it is possible to override the shock signal by selecting a vibration mode of the controller. The vibration mode is selected by a vibration switch 68 provided among the operator inputs of the housing. When the vibration mode is selected using the switch 68, the controller communicates with a vibration module which is mounted either integrally with the controller or integrally with the impulse device or as a separate stand alone module. In either instance, the vibration module includes a vibrating component which is actuated when a vibration signal is received from the controller. In the vibration mode, the controller is arranged to generate the vibration signal instead of the shock signal so that the user is not shocked but rather only senses vibration of the vibration module.

Other modes arranged to be selected by the user or an operator include role player modes, stress exposure modes, move-to-cover/intensity-ramping modes, and injured user simulating modes. In the instance of a roll player mode, the vibration switch is activated to select a vibration mode so that a player can learn certain actions prior to introducing the stress of electrical shocks in the training environment. Depending upon the a specific sub mode selected, the controller can be arranged such that a prescribed number of hits or activation signals must be received from the activation device for each shock signal being generated. For instance in the first sub mode, each activation signal generates a respective shock or vibration signal. However, in other sub modes, each shock or vibration signal is only generated after two or three activation signals are received.

In a stress exposure mode, the user is typically shocked with every hit by generating a shock signal for each activation signal received. The intensity of the shock in this instance is set by the manual adjustment of the knob 54. Accordingly, each subsequent shock signal is at the same prescribed intensity as the previous shock signal until the intensity is increased by the operator manually adjusting the knob 54. As a secondary stress exposure mode, the controller can be programmed to vibrate in response to the first activation signal received within a respective training session, however, each additional activation signal results in a shock signal instead of a vibration signal.

In the move-to-cover or intensity ramping mode, the intensity of the electrical shock is increased in intensity or duration or both in relation to a previously generated shock signal. In a first sub mode, the first activation signal received within a respective training session results in only a vibration signal being generated; however, the second activation signal results in generation of a shock signal and each subsequent shock signal is increased in intensity or duration relative to a previous shock signal. In alternative sub modes, the first activation signal received may generate either a minimum shock intensity or a medium shock intensity respectively.

In an injured user simulating mode, a single activation signal may result in a plurality of shock signals being generated at periodic intervals on a continuing basis for a prescribed period of time such that a user is repeatedly shocked at random intervals for the prescribed period of time to simulate a sustained injury. Various sub modes permit the shock signals to be generated at periodic intervals for different prescribed overall durations of the sequence. Alternatively, when the vibration mode is selected, vibration signals will be generated at periodic random intervals over the selected prescribed duration.

Turning now to FIG. 11, the remote operator input device 61 comprises a respective housing 100 separate from the housing of the controller 10. The input device 61 includes a suitable display 102 along with operator controls 104 including buttons, a touch responsive screen, or other suitable input found on many conventional computer devices. Inputs can be received from an operator using the input device 61 to adjust the prescribed shock criteria by wirelessly transmitting commands from the input device 61 to an integral receiver 106 on the controller 10 such as by RF signal for example. With the exception of the integral receiver 106 and the configuration of the operator inputs, the controller 10 is substantially identical to the previous embodiment in that adjustable shock criteria is stored on the controller itself while being adjustable through the operator input.

The input device 61 is particularly suited for use in a scenario involving multiple users within a common training environment. Each controller in this instance includes a respective controller identification such that the controller only responds to commands from the input device associated with that controller's identification. An operator or instructor in this instance can make different adjustments to the shock criteria stored on the different controllers of the respective users to customize the training environment to each user's skill level and level of stress inoculation. The operator in this instance is also able to recall data stored on each controller 10 from the input device 61 such that the cumulative number of activation signals received, the selected mode number or other desirable information associated with any selected controller 10 can be displayed on the display 102 of the input device 61.

As described herein, the controller is a suitable module for interconnection between various forms of activation devices and various forms of electrical impulse devices in a manner which allows the controller to be readily carried on the user together with the impulse device and readily separated from the user and connected devices for uses in different environments as may be desired.

Once connected to the respective activation device and impulse device the prescribed shock criteria is set by an operator at the user level by using the operator inputs on the housing carried on the user. The selection is made either by toggling through the modes using the mode selection button 68 or by simply adjusting the intensity of the shock signal using the manual knob 54. The shock signals can be overridden to instead generate vibration signals using the vibration switch. At any time during the use within a respective training session, the display button allows the total number of activation signals received during that training session to be displayed on the numerical display area. Alternatively, the numerical display provides an indication as to what operator mode has been selected.

As described above, FIG. 1 shows the front of the controller which consists of a plastic case which has an input connector, an output connector and a shock adjustment knob exposed at the top of the casing. On the right of the case front, it shows the power on/off switch which will cause the illumination of the power indicator light when placed in the on position. On the left of the case front, it shows the shock/vibrate switch which will cause the illumination of the shock warning light when placed in the shock position. At the top, center of the case front, it shows the digital display. The digital display will show numeric numbers from 0 to 99. Just below and to the left of the digital display is the display hits button. Just below and to the right of the digital display is the change mode button.

Figure 1A:
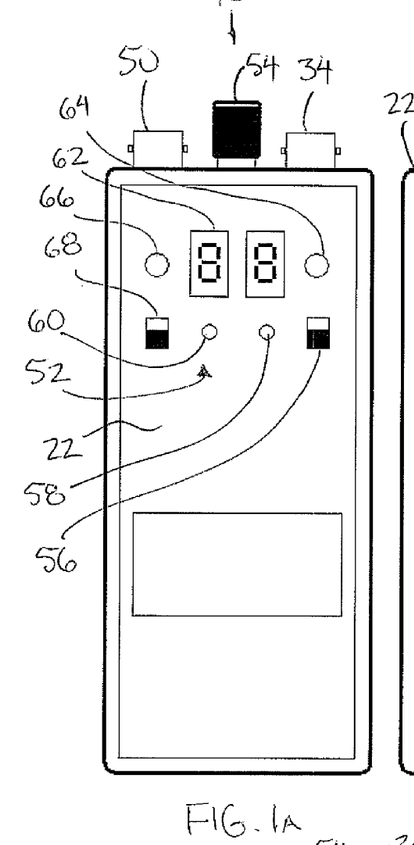
FIGS. 1A, 1B, 1C, 1D and 1E are front, side, rear, top, and bottom views of a first embodiment of the control module respectively.
Figures 1B, 1C:
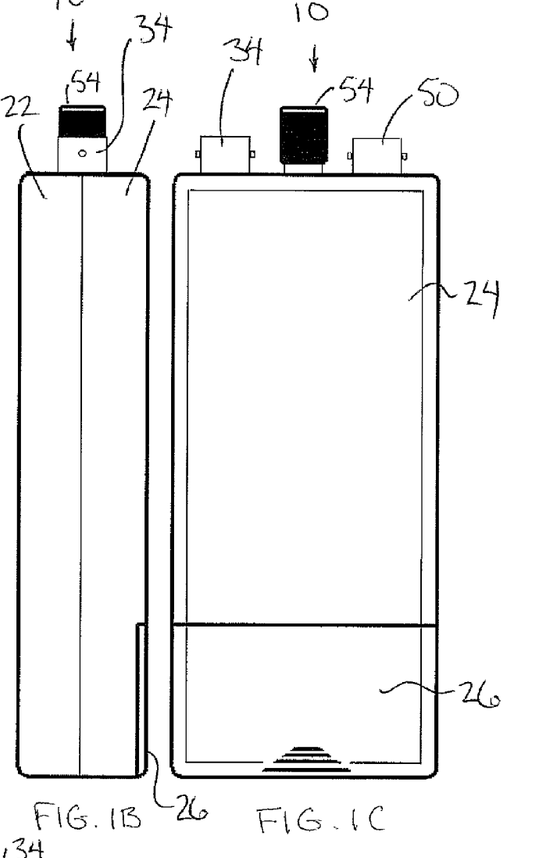
Figure 1D:
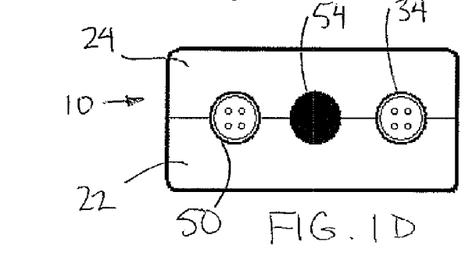
Figure 1E:
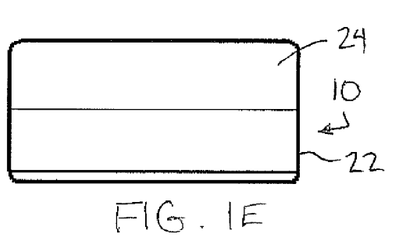
Figure 2:
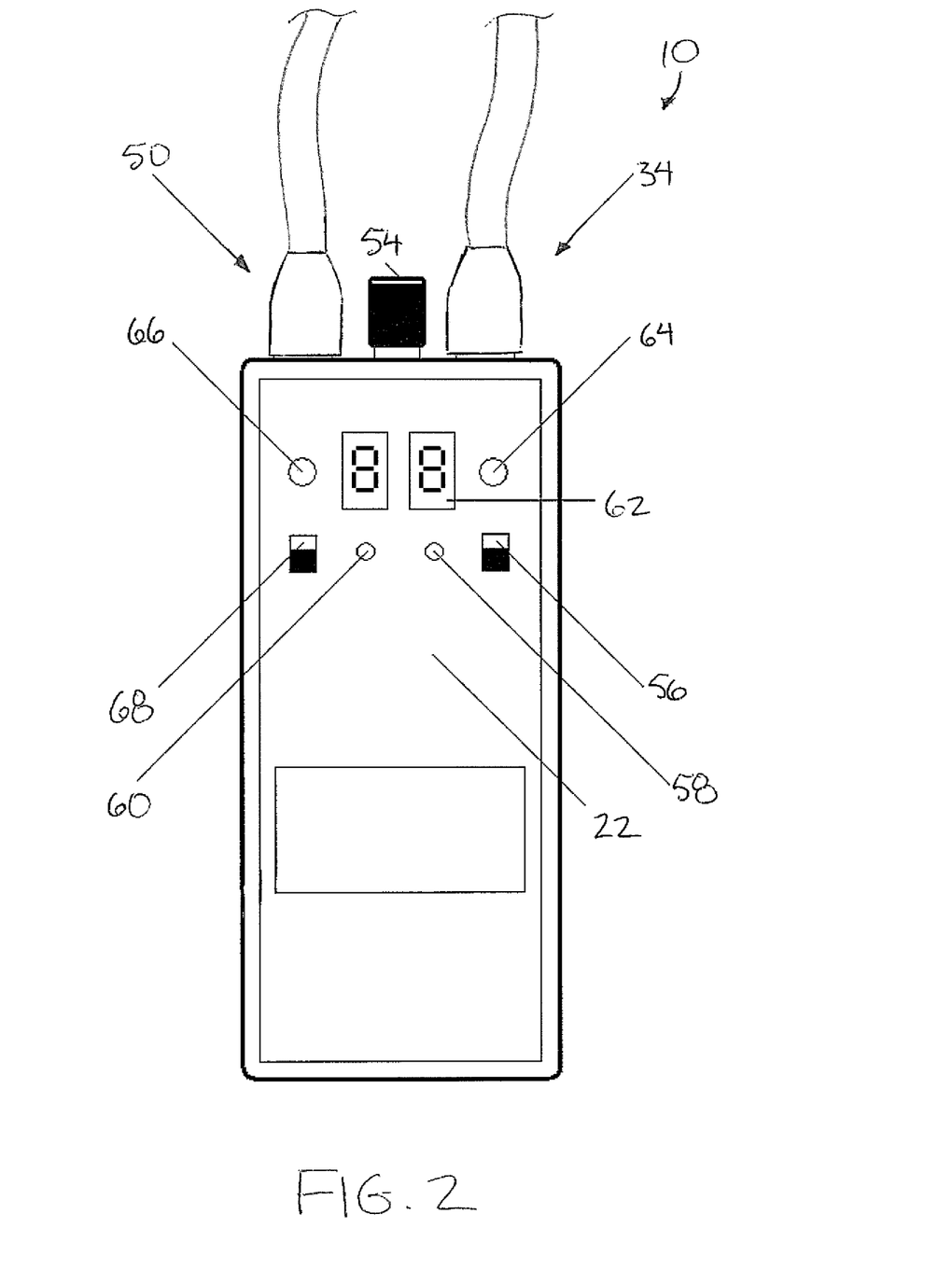
FIG. 2 is a front elevational view of the first embodiment of the control module illustrating connections to the activation device and the electrical impulse device respectively.
Figure 3:
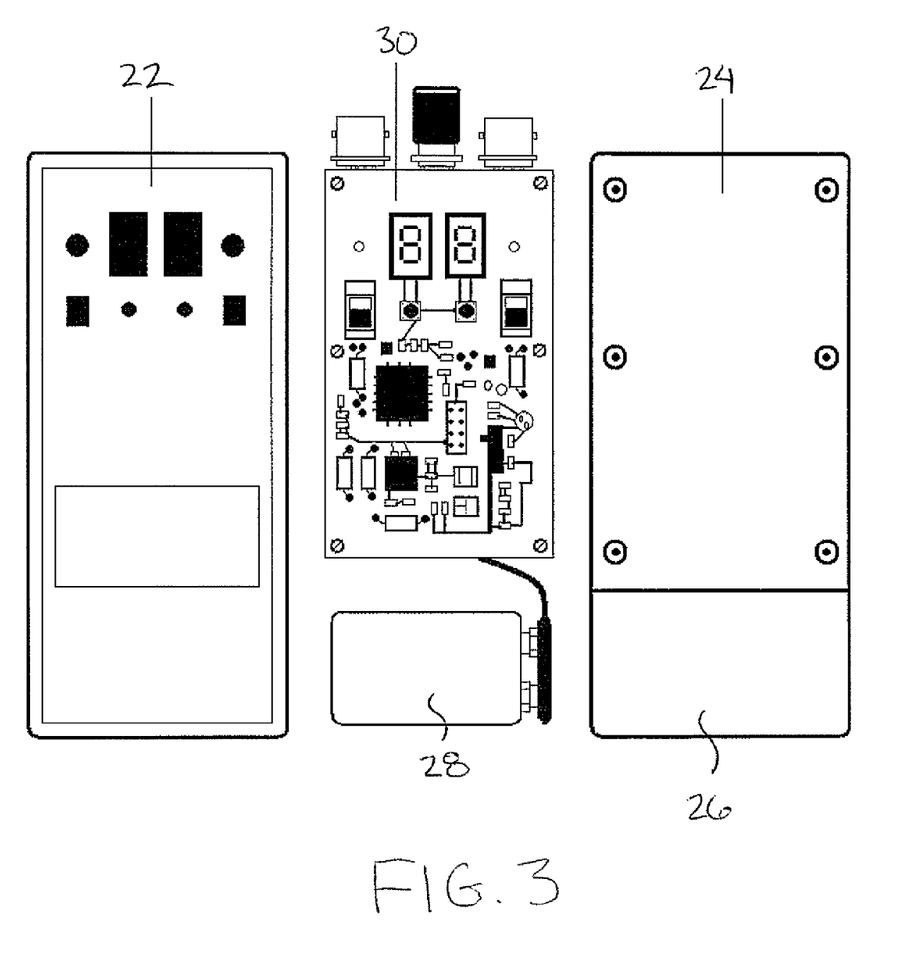
FIG. 3 is an exploded view of the front portion of the housing, the circuit board and the rear portion of the control module of the first embodiment.
Figure 4:
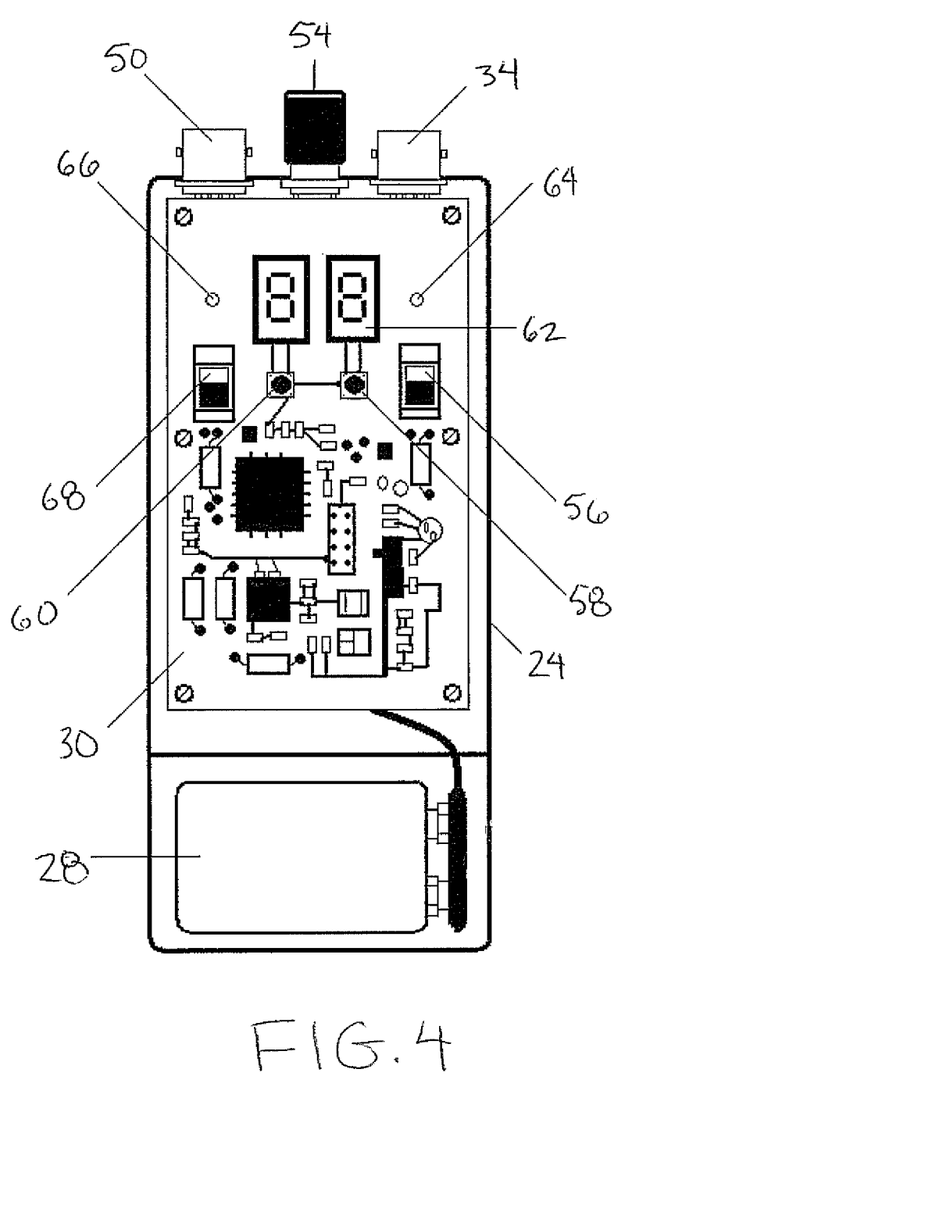
FIG. 4 is a front view of the control module of the first embodiment with the front portion of the housing shown removed.

FIG. 4 shows a cutaway of the front of the controller which reveals how the circuit board is housed in the controller casing. It shows the battery connector running from the circuit board to the battery and housed in the battery compartment of the controller casing.

Figure 5:
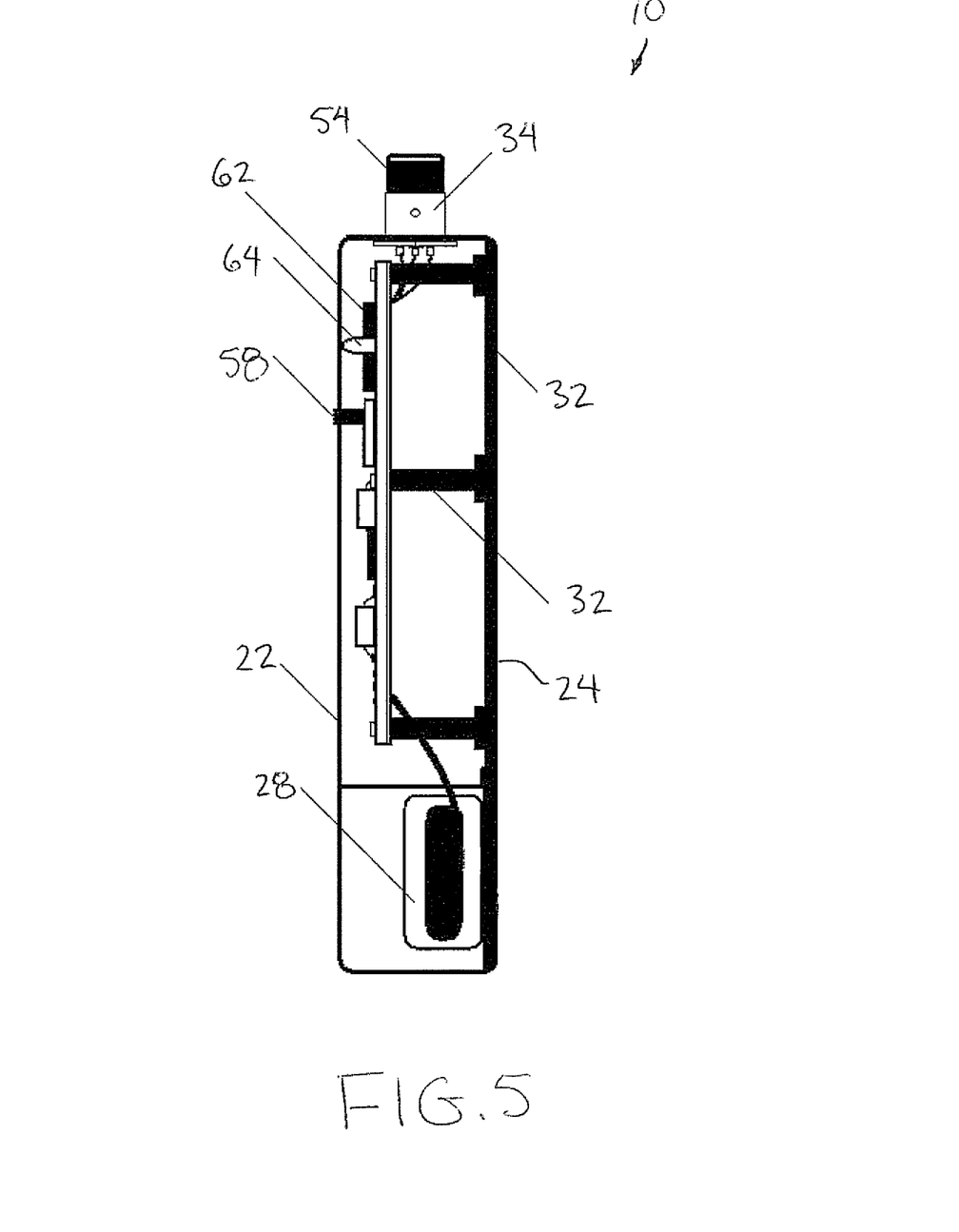
FIG. 5 is a partly sectional side elevational view of the first embodiment of the control module.
Figure 6:
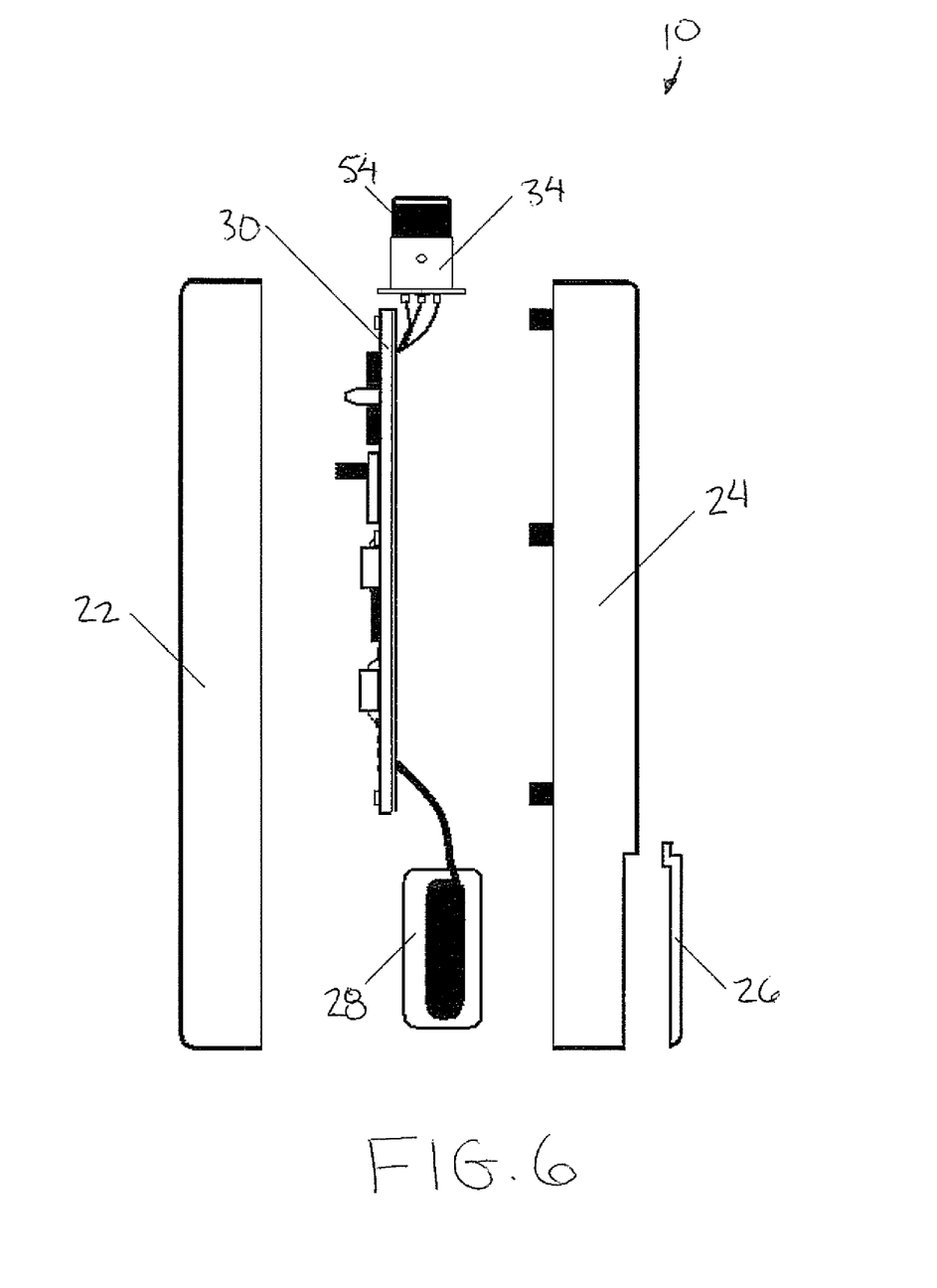
FIG. 6 is an exploded side elevational view of the first embodiment of the control module.
Figure 7:
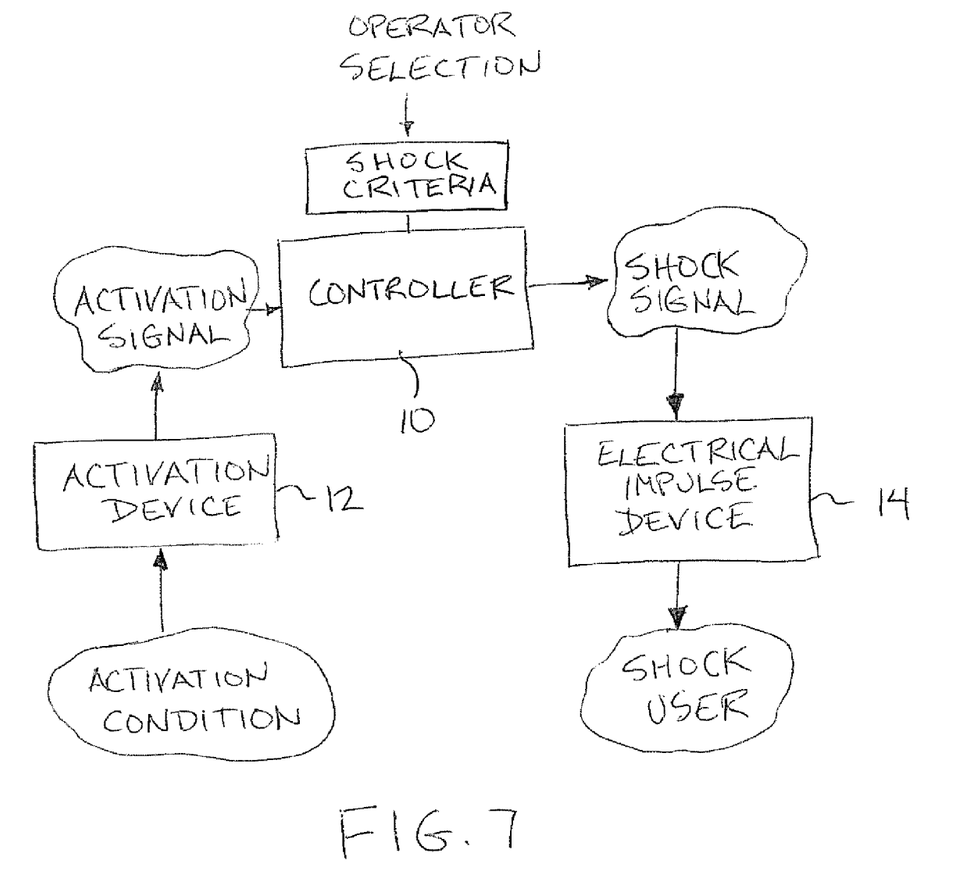
FIG. 7 is a schematic representation of the control module for connection between an activation device and an electrical impulse device according to various embodiments.

FIG. 5 shows a cutaway of the side of the controller which reveals how the circuit board is mounted to the mounting pegs of the controller case. When the battery is connected to the battery connector and the power on switch is turned to the on position the controller will become operational. If the "power on" switch is in the "on" position, the power indicator light will illuminate.

An electronic receiver will be connected to the input connector and when the stimulus threshold is reached to activate the receiver, the receiver will send an electronic signal into the controller through the input connector.

The signal will travel to the circuit board that will log each signal that is received. When the operator presses the display hits button, the number of signals recorded will be displayed in the digital display.

The signal will continue to travel through the circuit board which will send an electronic signal out the output connector. The signal will travel to a shock/vibration device that is connected to the output connector. Depending on the setting specified by the shock/vibrate switch, the device will deliver either a shock or vibration. If the shock/vibrate switch is in shock mode, the shock warning light will be illuminated.

By depressing the change mode button the digital display will display a number from 0 to 99 that corresponds with a pre-programmed mode that will differ from one to another on how the following variables are combined: 1) intensity of the shock, 2) Duration of the shock, 3) Vibration option, 4) Variation in number of hits before activation, 5) Location of shock, and 6) Variation in number of shocks.

The following is a detailed description of the variables that can be manipulated and combined with each other:

1) Intensity of the shock. The ability to vary the intensity of the shock allows the operator to vary the pain penalty. The ability to vary the pain penalty allows the device to deliver a pain penalty that is appropriate for the level of student being trained. A student that is new to acute stress training can have a low pain penalty to ensure they are not overwhelmed or enter a state of hyper-vigilance. A student that is becoming inoculated to a specific pain penalty can have the pain penalty increased, thereby increasing their level of stress. The intensity of the shock can also be varied so that each hit will cause an increase in pain stimulus. This increase will motivate the student to respond in an appropriate manner to prevent the escalation of pain.

2) Duration of the shock. Each individual's physiology will create varied pain sensation from person to person when delivering an equal level of shock. For this reason, some individuals can tolerate a higher level of shock than others. If the pain penalty is only increased by raising the intensity of the shock there may come a point where the level of electrical impulse may become dangerous to the individual. To ensure that the shock level remains within safety tolerances, the duration of the shock can be extended to create a longer duration of the pain penalty.

3) Vibration option. Having the option to cause a vibration occur instead of an electrical shock provides numerous advantages. First, it ensures that role players do not have to incur a pain penalty when training. Second, it allows for individuals first being introduced to reality based training to be exposed without fear of a pain stimulus. Finally, it can be integrated with the shocking system as a warning variable. For example, the device could be set so that the first hit a student receives results in a vibration response. Any further hits from that point will cause an electric shock to be delivered.

4) Variation in the number of hits before activation. In force on force firearms laser engagement systems each time a laser pulse activates the receiver worn by the student a single activation of the electrical shock or vibration device occurs. In real life encounters it often requires a law enforcement officer or soldier to have more than bullet strike the body before incapacitation of the assailant will occur. This system allows the operator to select how many times the receiver must be hit by the activating device before it will respond with the selected response. For example, a role player may have their controller set to a mode that requires two hits to occur before the system vibrates to let them know the student has achieved the desired goal.

5) Location of the shock. The location of the shocking device can be moved to facilitate the replication of an injury to a specific body part. Currently, most pain stimulus devices are designed to be delivered to the stomach or waist area of a student. The ability to change the location of the shock allows for the ability to interfere with physical performance. For example, the device could be affixed to the dominant arm of the student to create a situation that would interfere with the students ability to use their firearm properly during the training encounter.

6) Variation in number of shocks. Instead of having a single shock delivered when a desired mode is set, the number of shocks delivered can also be varied. This means that a single hit could result in more than a single shock being delivered. By randomizing the delivery of these shocks and the duration that this randomized firing occurs, the operator can create the simulation of the officer being injured. This will force the student to have to deal with a pain stimulus through a set time period. This forces the student to deal with the pain stimulus regardless of whether role player has been effectively controlled.

As described herein the controller can be integrated with any electronic based training system that will allow for an instructor/operator to select specific modes based on the type of training desired. These modes will have varied settings of pain penalties and time durations based on the needs of the students. It will also allow for a vibration mode to be selected so that role players will no longer be in fear of receiving a pain penalty. The following are examples of the various modes that could be selected, and how each is beneficial:

Role Player Mode: In current force on force training, the role player must wear an enormous amount of protective equipment to protect them from projectiles. By selecting a setting in role player mode, the resulting stimulus will be a vibration instead of a pain penalty. This vibration can be varied in several ways. The vibration can be varied in type and duration based on what specific receiver is activated. The number of stimuli that are sensed can be varied before the vibration activates.

Move to Cover Mode: Since all current products do not allow for the pain penalty to vary an individual that has a higher pain tolerance may not respond as desired when receiving the pain penalty. In Move to Cover Mode, the pain penalty will increase with each activation of the controller. The settings in this mode can be varied based on the number of stimuli required before the pain penalty is increased. It can also start with a vibration as a warning of impending pain penalty for subsequent activations.

Injured Officer Mode: All current products are designed to only deliver a pain penalty at the specific point that force would have been delivered in a real world encounter. By selecting injured officer mode, the controller will continue to deliver a pain penalty randomly for a set period of time. This will cause the officer to have to continue to operate with an ongoing pain penalty allowing for the simulation of an injury. The settings in this mode can be varied for the amount of time the controller continues to activate, the duration of the pain penalty and the intensity of the pain penalty.

Stress Inoculation Mode: In order for true stress inoculation to occur from a pain penalty product, the product must be able to deliver the pain in an incremental manner based on the ability for the student to tolerate the pain penalty. In Stress Inoculation Mode, the controller will allow the operator to use a potentiometer to adjust the pain penalty that will be delivered to the specific student wearing the controller. The settings in this mode can be varied for the duration of the pain stimulus along with the number of stimuli required to create an activation.

Role Player Modes (Ensure Shock/Vibrator Switch is Set to Vibrate):

Mode 1: Vibrator will activate every time a single hit is registered.

Mode 2: Vibrator will activate every time two hits are registered.

Mode 3: Vibrator will activate every time three hits are registered.

Stress Exposure Modes (Set Appropriate Shock Level for Student):

Mode 4: Shock will activate every time a single hit is registered.

Mode 5: Vibrate will activate first hit and then shock ever hit afterwards.

Move to Cover Modes (Pain Penalty Increases with Each Subsequent Hit):

Mode 6: First hit registered will vibrate, second will begin shock sequence.

Mode 7: First hit registered will shock at Low setting then increase.

Mode 8: First hit registered will shock at Medium setting then increase.

Injured Officer Modes (Shock Will Continue to Fire Randomly for Set Time Period):

Mode 9: Will continue to activate randomly for 10 seconds after first hit.

Mode 10: Will continue to activate randomly for 20 seconds after first hit.

Mode 11: Will continue to activate randomly for 30 seconds after first hit.

Mode 12: Will continue to vibrate randomly for 30 seconds after first hit.

The controller of the present invention is also described herein as the STRESSINOC™ System and is a multi-application stress inoculation tool. It allows trainers to integrate a safe, localized electric stun pain penalty into any type of training environment that requires elevated stress. The STRESSINOC™ System is a software based controller with multiple settings that allow the user to vary the intensity of the pain penalty to match the appropriate level of the student using the device.

The various modes available on the controller allow for unique applications of the pain penalty. The instructor can select a mode that will allow each activation of the STRESSINOC™ System to deliver a higher pain penalty than the previous activation. This is very useful to help steer the student away from actions that are not the desired response.

The instructor also has the ability to replicate an injury in the student by selecting "Injury Mode". In this mode, the controller will randomly deliver stuns over a set time period. This forces the student to have to focus on the task at hand and ignore interference from the pain stimulus.

The STRESSINOC™ System is also designed to work with customized BattleField FX IED's. This includes the Suicide Vest/IED Trainer. When activated, the BattleField FX IED's or Suicide Vest will deliver a loud rapport (112 db). Simultaneously the mock explosion will activate any STRESSINOC™ System in the immediate area. This allows for unique training environments as the IED will activate the vest through walls, from inside vehicles, etc., allowing for the mock explosions that replicate real IED conditions that are not line of sight.

Trainers can use the system to add stress to active shooter training, bomb searches, vehicle searches, disarming procedures, etc.

Another feature of the present invention is an instructor (Master Control) switch such as the remote input device 61 described above. The STRESSINOC™ System can also come complete with a RF key fob 20 which allows for activation by the instructor at any point during the training exercise. This gives complete control to the instructor ensuring that the desired pain penalty can be delivered precisely when required.

The present invention may also be integrated with a Battle Field Tank/Aircraft Simulator. Currently, performance anxiety is one of the few means to create stress when utilizing battle simulator systems. For the first time, the STRESSINOC™ System creates the ability to create higher levels of stress through pain penalties. This includes the utilization of "Injury Mode" to place the student into a training environment that replicates having to perform after receiving an injury during the battle.

The present invention also has use in K9 Handler Training. One of the most challenging aspects of training a searching or tracking canine, is ensuring the canine has been prepared to work with the handler in the real world, when the handler is stressed and sending mixed messages to their dog. The STRESSINOC™ System allows the instructor to create stress on the trainer during scenario training with their canine to inoculate the canine to a stressed handler.

In alternative embodiments different materials, sizes and interconnections can be used for all components. In lieu of a digital display, any type of electronic display may be utilized. In lieu of buttons and switches a touch screen application could be utilized and may be imbedded within the display. In lieu of wires, any electronic messages could be sent with an RF signal. The circuitry could be removed and placed in an existing structure being used by a product that is need of incorporating our methodology. The software modes could be programmed into existing circuitry in related products.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of stress exposure training using a triggering device arranged to generate a triggering signal in response to a stress exposure training event and an electrical impulse device arranged to be worn by a user and deliver an electrical shock to the user in response to a shock signal, the method comprising:

providing a receiver arranged to wirelessly receive the triggering signal;

providing a controller storing prescribed shock criteria thereon relating to a characteristic of an electric shock to be delivered to the user and having an activation input arranged to communicate with the receiver for receiving the triggering signal from the triggering device;

supporting the electrical impulse device, the receiver and the controller including the prescribed shock criteria stored thereon on the user such that the receiver is in communication with the activation input on the controller and such that the controller is in communication with the electrical impulse device;

adjusting the prescribed shock criteria of the controller supported on the user through an operator input of the controller such that the characteristic of the electrical shock to be delivered to the user is adjusted;

positioning the triggering device at a remote location relative to the receiver and the controller on the user;

wirelessly transmitting the triggering signal from the triggering device to the receiver; and delivering an electrical shock to the user using the electrical impulse device in response to the receiver receiving the triggering signal in which the characteristic of the electrical shock corresponds to the adjusted prescribed shock criteria by using the controller to generate the shock signal according to the adjusted prescribed shock criteria subsequent to receipt of the triggering signal.

2. The method according to claim 1 including coupling the controller directly to the electrical impulse device.

3. The method according to claim 1 including providing a remote operator input separate from the controller and enabling adjustments to the prescribed criteria to be communicated wirelessly from the remote operator input to the controller.

4. The method according to claim 1 including providing a manually adjusted operator input directly on the controller and enabling the prescribed shock criteria to be manually adjusted through the operator input on the controller.

5. The method according to claim 1 including designating an intensity of the electrical shock as one criterion of the prescribed shock criteria and enabling the intensity of the electrical shock to be adjusted using the operator input.

6. The method according to claim 5 including providing a manually adjustable control as one operator input on the controller and enabling the intensity of the electrical shock to be adjusted using the manually adjustable control.

7. The method according to claim 1 including designating duration of the electrical shock as one criterion of the prescribed shock criteria and enabling the duration of the electrical shock to be adjusted using the operator input.

8. The method according to claim 1 including designating receipt of a prescribed plurality of triggering signals being required to generate one shock signal as one criterion of the prescribed shock criteria and enabling the prescribed plurality of triggering signals to be adjusted using the operator input.

9. The method according to claim 1 including enabling the controller to communicate with a plurality of electrical impulse devices worn by the user in which each electrical impulse device includes an identification and designating the identification of one of the electrical impulse devices as one criterion of the prescribed shock criteria.

10. The method according to claim 1 including designating a frequency of the electrical shock as one criterion of the prescribed shock criteria and enabling the frequency of the electrical shock to be adjusted using the operator input.

11. The method according to claim 1 including designating a plurality of controller modes associated with the controller in which each controller mode has different prescribed shock criteria, and enabling the prescribed shock criteria to be adjusted by enabling an operator to select one of the controller modes using the operator input on the controller supported on the user.

12. The method according to claim 11 including providing an intensity ramping mode among the controller modes in which an intensity of the electrical shock is increased in relation to a previously generated shock signal.

13. The method according to claim 11 including providing an injury simulating mode in which a plurality of shock signals are generated at periodic intervals from one another in response to a single triggering signal.

14. The method according to claim 11 including providing a display on the controller supported on the user which identifies which controller mode has been selected.

15. The method according to claim 1 including providing the controller with a memory such that the controller is arranged to record activation data associated with a triggering signal in response to receiving said triggering signal.

16. The method according to claim 1 including utilizing the controller in combination with the triggering device in which the triggering device comprises a light-based training system comprising a simulated weapon arranged to generated a light-based signal, a support structure arranged to be self supporting on a body of the user, the receiver being supported on the support structure in which the receiver comprises a sensor arranged to detect a light-based signal directed thereon by the simulated weapon such that the controller is arranged to generate the shock signal upon detection of the light-based signal.

17. The method according to claim 1 including providing a receiver which is arranged to receive triggering signals in the form of a radio frequency signal.

18. The method according to claim 17 including utilizing the controller in combination the triggering device in which the triggering device comprises a simulated explosive device comprising a trigger arranged to generate the triggering signal in response to a prescribed condition and a transmitter arranged to transmit the triggering signal in the form of a radio frequency signal to the controller in response to the triggering signal being generated by the trigger.

19. The method according to claim 1 wherein the characteristic of the electrical shock which is adjusted is selected from the list consisting of: i) an intensity of the electrical shock, and ii) a duration of the electrical shock.

20. A method of stress exposure training using an activation device arranged to generate an activation signal in response to a stress exposure training event and an electrical impulse device arranged to be worn by a user and deliver an electrical shock to the user in response to a shock signal, the method comprising:

providing a controller comprising prescribed shock criteria relating to a characteristic of an electrical shock to be delivered to the user and a plurality of selectable modes stored thereon in which the selectable modes are different in configuration from one another, each selectable mode designating generation of at least one shock signal or at least one vibration signal or a combination of shock and vibration signals in response to receipt of one activation signal;

providing an activation input on the controller for receiving the activation signal from the activation device;

providing a vibration module which is arranged to vibrate in response to a vibration signal;

supporting the electrical impulse device, the vibration module, and the controller including the prescribed shock criteria and the plurality of selectable modes stored thereon on the user such that the controller is in communication with the electrical impulse device and the controller is in communication with the vibration module;

adjusting the prescribed shock criteria of the controller supported on the user through an operator input of the controller;

selecting one of the plurality of selectable modes of the controller through the operator input of the controller;

transmitting an activation signal from the activation device to the activation input of the controller;

using the controller to generate at least one shock signal or at least one vibration signal or a combination of shock and vibration signals as designated by the selectable mode which has been selected through the operator input in response to receipt of the activation signal;

vibrating the vibration module in response to each vibration signal generated by the controller; and delivering an electrical shock to the user using the electrical impulse device in response to each shock signal generated by the controller in which the electrical shock has a characteristic which corresponds to the adjusted prescribed shock criteria.

21. The method according to claim 20 further comprising providing the controller with a combined mode in which the controller is arranged to generate one vibration signal in response to receipt of a first activation signal and in which the controller is arranged to generate one shock signal in response to receipt of a second activation signal subsequent to receipt of the first activation signal.

* * * * *